(12) United States Patent
Kim et al.

(10) Patent No.: US 11,463,976 B2
(45) Date of Patent: Oct. 4, 2022

(54) METHOD FOR TERMINAL, WHICH SUPPORTS SIDELINK, TO TRANSMIT SIGNALS IN WIRELESS COMMUNICATION SYSTEM, AND TERMINAL THEREFOR

(71) Applicant: LG ELECTRONICS INC., Seoul (KR)

(72) Inventors: Heejin Kim, Seoul (KR); Seungmin Lee, Seoul (KR); Hanbyul Seo, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 17/274,607

(22) PCT Filed: Sep. 30, 2019

(86) PCT No.: PCT/KR2019/012722
§ 371 (c)(1),
(2) Date: Mar. 9, 2021

(87) PCT Pub. No.: WO2020/067831
PCT Pub. Date: Apr. 2, 2020

(65) Prior Publication Data
US 2022/0053440 A1 Feb. 17, 2022

(30) Foreign Application Priority Data
Sep. 28, 2018 (KR) .................. 10-2018-0116333

(51) Int. Cl.
*H04W 56/00* (2009.01)
(52) U.S. Cl.
CPC ............... *H04W 56/0045* (2013.01)

(58) Field of Classification Search
CPC .. H04W 56/00; H04W 56/0045; H04W 92/18
See application file for complete search history.

(56) References Cited

U.S. PATENT DOCUMENTS

| | | | |
|---|---|---|---|
| 10,681,724 B2 * | 6/2020 | Blasco Serrano | ......................... H04W 72/0446 |
| 2018/0198665 A1 * | 7/2018 | Guo | ................. H04W 56/0055 |
| 2019/0289561 A1 * | 9/2019 | Corley | ............. H04W 72/0446 |

(Continued)

FOREIGN PATENT DOCUMENTS

| | | |
|---|---|---|
| KR | 10-2018-0088735 A | 8/2018 |
| WO | 2018/174779 A1 | 9/2018 |

OTHER PUBLICATIONS

International Search Report from PCT/KR2019/012722, dated Jan. 30, 2020.

(Continued)

*Primary Examiner* — Nathan S Taylor
(74) *Attorney, Agent, or Firm* — Dentons US LLP

(57) ABSTRACT

Disclosed is a method for a first terminal, which supports a sidelink, to transmit signals in a wireless communication system. Specifically, the method may comprise: a step for receiving a sidelink synchronization signal (SLSS) from a second terminal; a step for acquiring information about a subframe boundary time point for timing synchronization, and information about a propagation delay time; and a step for transmitting a sidelink signal to the second terminal on the basis of the subframe boundary time point and a timing advance (TA) that is twice the length of the propagation delay time.

11 Claims, 24 Drawing Sheets

(56) References Cited

U.S. PATENT DOCUMENTS

| | | | |
|---|---|---|---|
| 2019/0289627 A1* | 9/2019 | Blasco Serrano | H04W 76/14 |
| 2019/0342132 A1* | 11/2019 | Kazmi | H04L 5/001 |
| 2019/0387508 A1* | 12/2019 | Park | H04W 72/042 |
| 2020/0120458 A1* | 4/2020 | Aldana | H04W 4/08 |
| 2020/0295903 A1* | 9/2020 | Faxér | H04W 24/10 |
| 2020/0396632 A1* | 12/2020 | Ramachandra | H04L 5/0048 |
| 2020/0396759 A1* | 12/2020 | Baldemair | H04L 1/0061 |
| 2021/0025960 A1* | 1/2021 | Rydén | G01S 1/0428 |
| 2021/0153114 A1* | 5/2021 | Lindheimer | H04W 48/02 |
| 2021/0329553 A1* | 10/2021 | Åström | H04W 52/0212 |

OTHER PUBLICATIONS

Written Opinion of the ISA from PCT/KR2019/012722, dated Jan. 30, 2020.
R1-1809158: 3GPP TSG RAN WG1 Meeting #94, Gothenburg, Sweden, Aug. 20-24, 2018, NTT Docomo, Inc., "Synchronization mechanism," (6 Pages).
R1-1808521: 3GPP TSG RAN WG1 Meeting #94, Gothenburg, Sweden, Aug. 20-24, 2018, LG Electronics, "Discussion on sidelink synchronization mechanism," (6 Pages).
R1-1808697: 3GPP TSG RAN WG1 Meeting #94, Gothenburg, Sweden, Aug. 20-24, 2018, Intel Corporation, "Remaining Aspects of eV2X Evaluation Methodology and Assumption," (12 Pages).

* cited by examiner (a)

(b)

(a)

(b)

(a)

(b)

METHOD FOR TERMINAL, WHICH SUPPORTS SIDELINK, TO TRANSMIT SIGNALS IN WIRELESS COMMUNICATION SYSTEM, AND TERMINAL THEREFOR

This application is the National Stage filing under 35 U.S.C. 371 of International Application No. PCT/KR2019/012722, filed on Sep. 30, 2019, which claims the benefit of Korean Patent Application No. 10-2018-0116333, filed on Sep. 28, 2018, the contents of which are all hereby incorporated by reference herein in their entirety.

TECHNICAL FIELD

The present disclosure relates to a method of transmitting a signal by a user equipment (UE) supporting sidelink in a wireless communication system and a UE therefor. More specifically, the present disclosure relates to a method of receiving, by a UE, a sidelink synchronization signal, configuring timing synchronization considering a propagation delay, and transmitting a sidelink signal by applying a timing advance to the configured timing synchronization.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE DISCLOSURE

Technical Problems

The present disclosure provides a method of transmitting a signal by a UE supporting sidelink in a wireless communication system. More specifically, the present disclosure provides a method of receiving, by a UE, a sidelink synchronization signal, configuring timing synchronization considering a propagation delay, and transmitting a sidelink signal by applying a timing advance to the configured timing synchronization.

The objects to be achieved with the present disclosure are not limited to what has been particularly described hereinabove and other objects not described herein will be more clearly understood by persons skilled in the art from the following detailed description.

Technical Solutions

According to an aspect of the present disclosure, provided herein is a method of transmitting a sidelink signal by a first user equipment (UE) supporting sidelink to a second UE in a wireless communication system, including receiving a sidelink synchronization signal (SLSS) from the second UE, acquiring information about a subframe boundary timing for timing synchronization and information about a propagation delay, based on a reception timing of the SLSS, and transmitting the sidelink signal to the second UE, based on a timing advance (TA) having a length twice the propagation delay and on the subframe boundary timing.

The sidelink signal and the SLSS may be transmitted on different frequency carriers.

A cyclic prefix (CP) length for the sidelink signal may be shorter than a CP length for the SLSS.

The sidelink signal may be transmitted in an above-6 GHz frequency band and the SLSS may be received in a below-6 GHz frequency band.

The subframe boundary timing may be commonly applied to frequency carriers configured for the first UE.

The method of transmitting the sidelink signal may further include calculating a number of symbols related to a length of the TA.

Information about whether the TA is applied to the subframe boundary timing and information about the number of symbols related to the length of the RA may be transmitted to the second UE.

The second UE may be a synchronization source UE of the first UE.

The first UE may be communicable with at least one of a UE other than the first UE, a network, a base station, or an autonomous driving vehicle.

Advantageous Effects

According to an example or implementation of the present disclosure, an accurate transmission and reception timing for a sidelink signal may be configured by aligning synchronization in consideration of a propagation delay so that communication quality may be improved.

The effects to be achieved with the present disclosure are not limited to what has been particularly described hereinabove and other advantages not described herein will be more clearly understood by persons skilled in the art from the following detailed description of the present disclosure.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE DISCLOSURE

Figure 1:
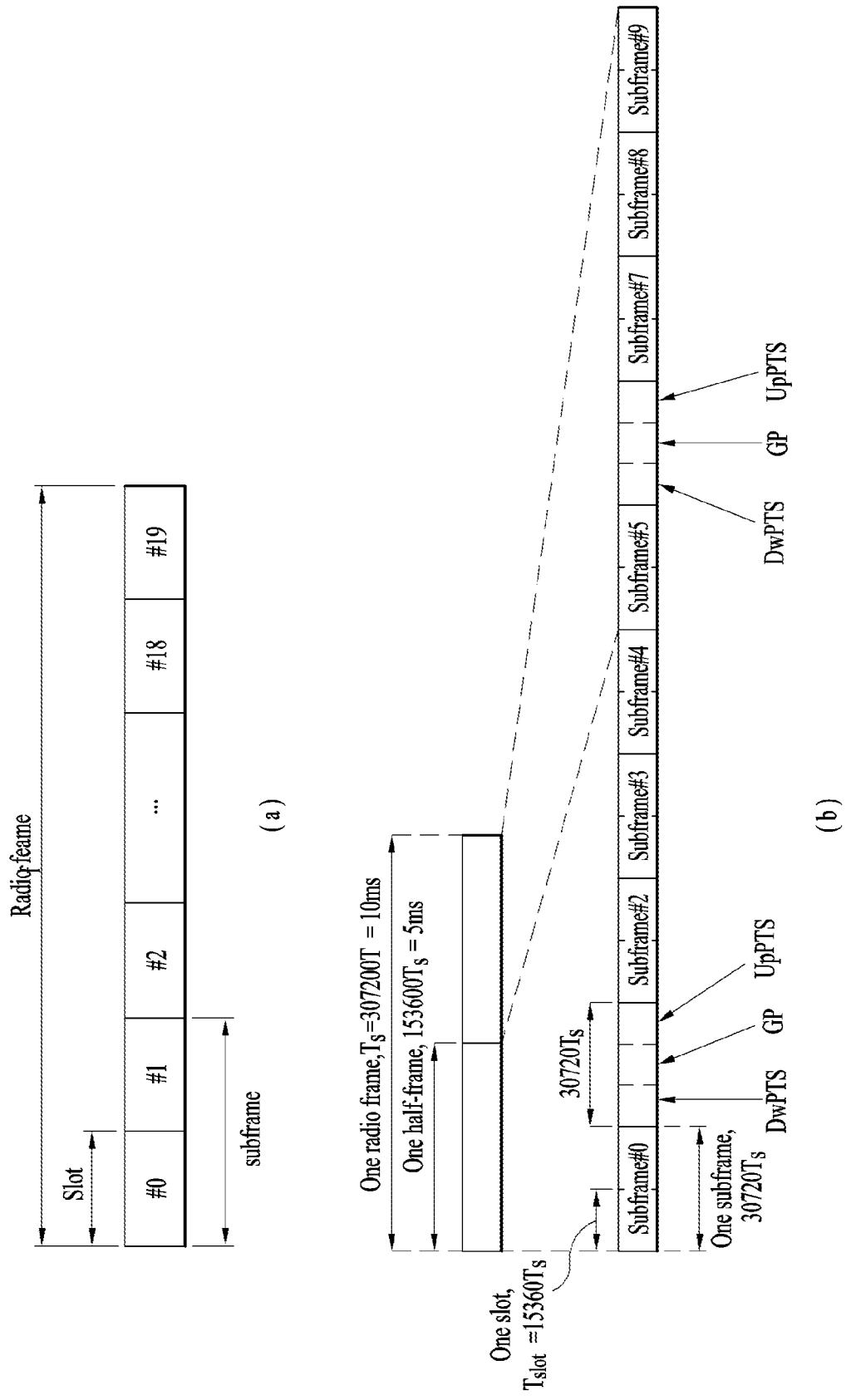
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc. The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

Hereinafter, multiple user cases of 5G communication systems including NR will be described.

5G is a technique for providing a stream rated at hundreds of megabits per second to gigabytes per second and may complement fiber-to-the-home (FTTH) and cable-based broadband (or DOCSIS). Such a high speed may be required to provide not only virtual reality (VR) and augmented reality (AR) but also television (TV) services with a resolution of 4K or higher (6K, 8K, or higher). VR and AR applications mostly include immersive sporting events. A specific application may require a special network configuration. For example, for a VR game, a game company may need to integrate a core server with an edge network server of a network operator in order to minimize latency.

The automotive sector is expected to be an important new driver for 5G with many use cases for vehicle mobile communication. For example, entertainment for passengers requires high-capacity and high-mobility broadband at the same time because future users expect to continue high quality of connections independently of their locations and speeds. Another use case in the automotive field is an AR dashboard. The AR dashboard identifies an object in the dark and tells a driver about the distance and movement of the object, that is, displays overlay information on top of what the driver is seeing through the front window. In the future, wireless modules enable communication between vehicles, information exchange between vehicles and supporting infrastructures, and information exchange between vehicles and other connected devices (e.g., device accompanied by pedestrians). A safety system guides alternative driving courses so that drivers may drive safely to reduce the risk of accidents. The next step would be a remote control vehicle or a self-driving vehicle, which requires exceptionally reliable and extremely fast communication between different self-driving vehicles and between vehicles and infrastructures. In the future, the self-driving vehicle will perform all driving activities, and the driver will focus only on traffic problems that the vehicle cannot autonomously identify. Technical requirements of the self-driving vehicle are ultra-low latency, ultra-high speed, and high reliability to increase traffic safety to levels that humans cannot achieve.

In a smart city and a smart home, which is called a smart society, a high-density wireless sensor network will be embedded. A distributed network of intelligent sensors will identify conditions for cost and energy-efficient maintenance of a city or house. Similar settings may be established for each home. Temperature sensors, window and heating controllers, security systems, and home appliances are all wirelessly connected. Although many of these sensors have typically low data rates, low power, and low cost, real-time high-definition video may be required in a particular type of device for monitoring.

Since consumption and distribution of energy including heat or gas is highly decentralized, automatic control of a distributed sensor network is required. A smart grid collects information and interconnects sensors using digital information and communication technology to operate the sensors based on the collected information. Such information may include supplier and consumer behavior, thus enabling the smart grid to improve the distribution of fuel such as electricity, in efficient, reliable, economical, production-sustainable, and automatic manners. The smart grid may be considered as a sensor network with low latency.

The health sector has a large number of applications that may benefit from mobile communication. Communication systems may support telemedicine, that is, provide medical care in remote areas. Telemedicine may help to reduce a distance barrier and improve access to medical services that are not continuously available in distant rural areas. Telemedicine is also used to save lives in critical treatment and emergency situations. A wireless sensor network based on mobile communication may provide remote monitoring and sensors for parameters, such as heart rate and blood pressure.

Wireless and mobile communication gradually becomes important in industrial applications. Wiring involves high costs for installation and maintenance. Thus, the possibility of replacement a cable by a reconfigurable wireless link is attractive for many industrial fields. However, to this end, a wireless connection needs to operate with similar latency, reliability, and capacity to those of a cable. In addition, the maintenance thereof also needs to be simplified. Low latency and low error probabilities are new requirements for 5G connections.

Logistics and freight tracking are important use cases for mobile communication that enables the tracking of inventory and packages wherever they are through using location based information systems. The logistics and freight use cases typically require lower data rates but need wide coverage and reliable location information.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts 01-DMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
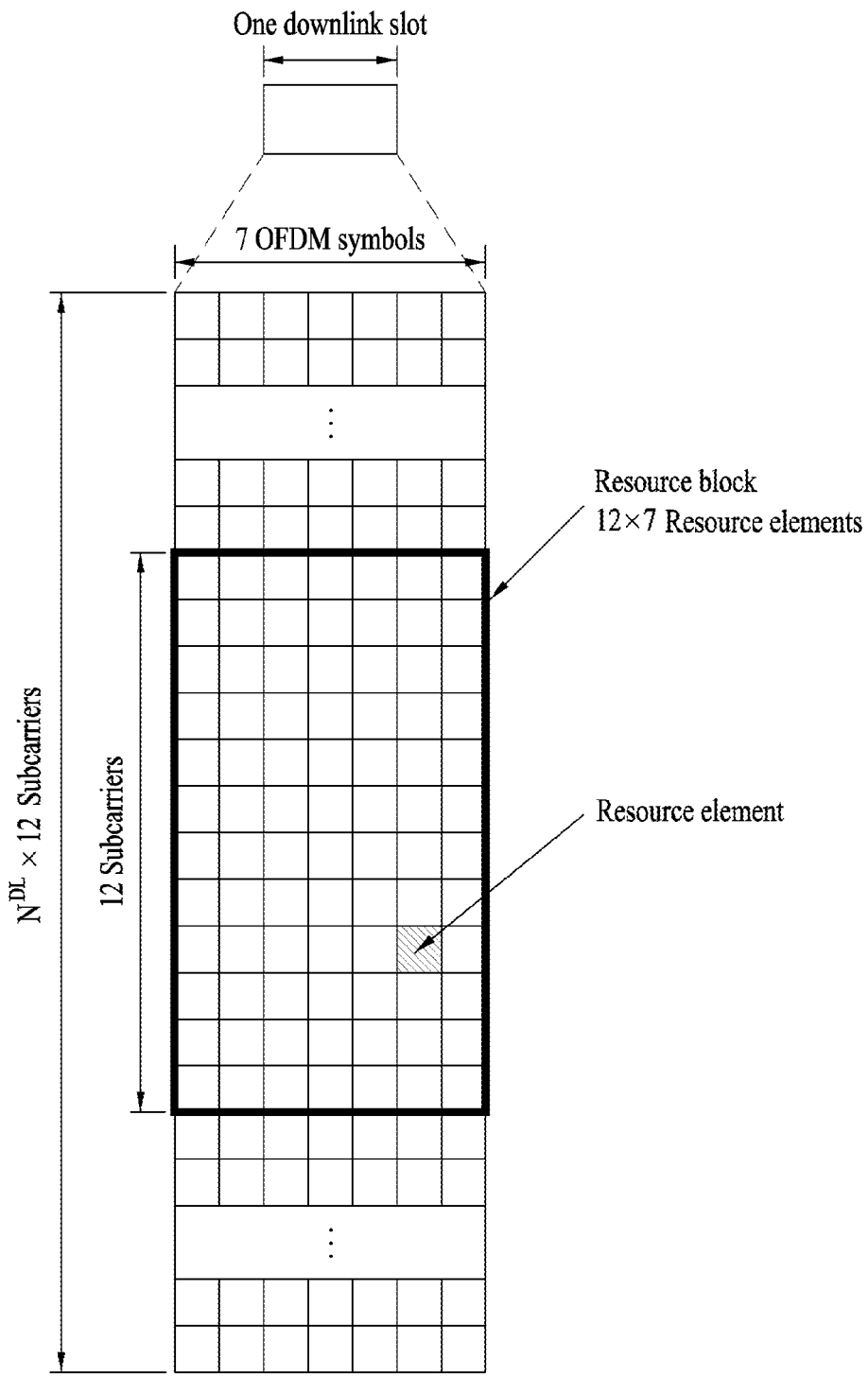
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
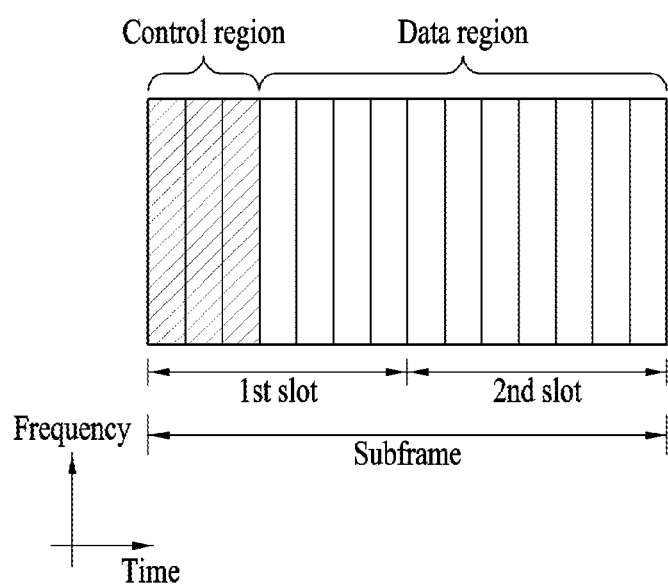
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
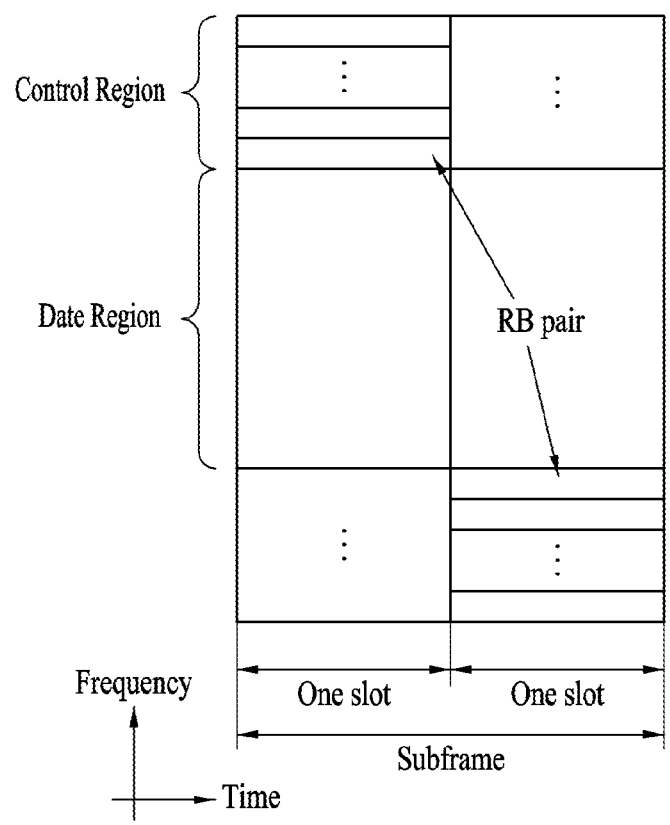
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

Figure 5:
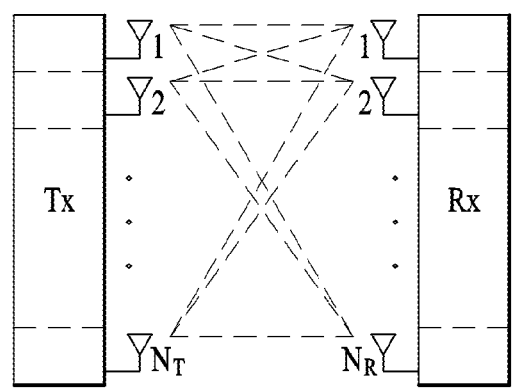
FIG. 5 is a view illustrating the configuration of a wireless communication system having multiple antennas.
Figure 5:
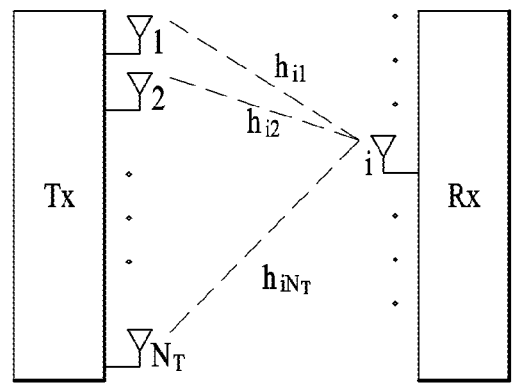

FIG. 5 is a diagram illustrating a configuration of a wireless communication system having multiple antennas.

As shown in FIG. 5(a), if the number of Tx antennas is increased to NT and the number of Rx antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained.

In order to explain a communicating method in a MIMO system in detail, mathematical modeling can be represented as follows. It is assumed that there are NT Tx antennas and NR Rx antennas.

Regarding a transmitted signal, if there are NT Tx antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an ith Tx antenna and jth information. W is also called a precoding matrix.

If the NR Rx antennas are present, respective received signals $y_1, y_2, \ldots y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the NT Tx antennas to the Rx antenna i. The channels may be combined and expressed in the form of a vector and a matrix. In FIG. 5(b), the channels from the NT Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An additive white Gaussian noise (AWGN) is added to the actual channels after a channel matrix H. The AWGN $n_1, n_2, \ldots n_{N_R}$ respectively added to the NR Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \quad \text{[Equation 10]}$$

-continued $$\begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number NR of Rx antennas and the number of columns thereof is equal to the number NT of Tx antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme.

Figure 6:
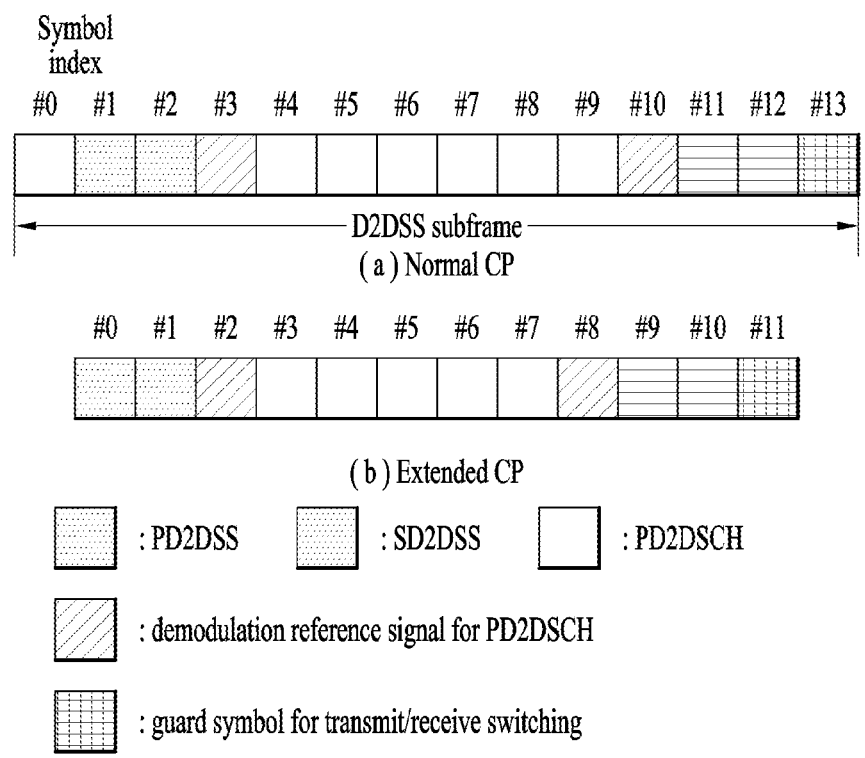
FIG. 6 is a view illustrating a subframe carrying a device-to-device (D2D) synchronization signal.

FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
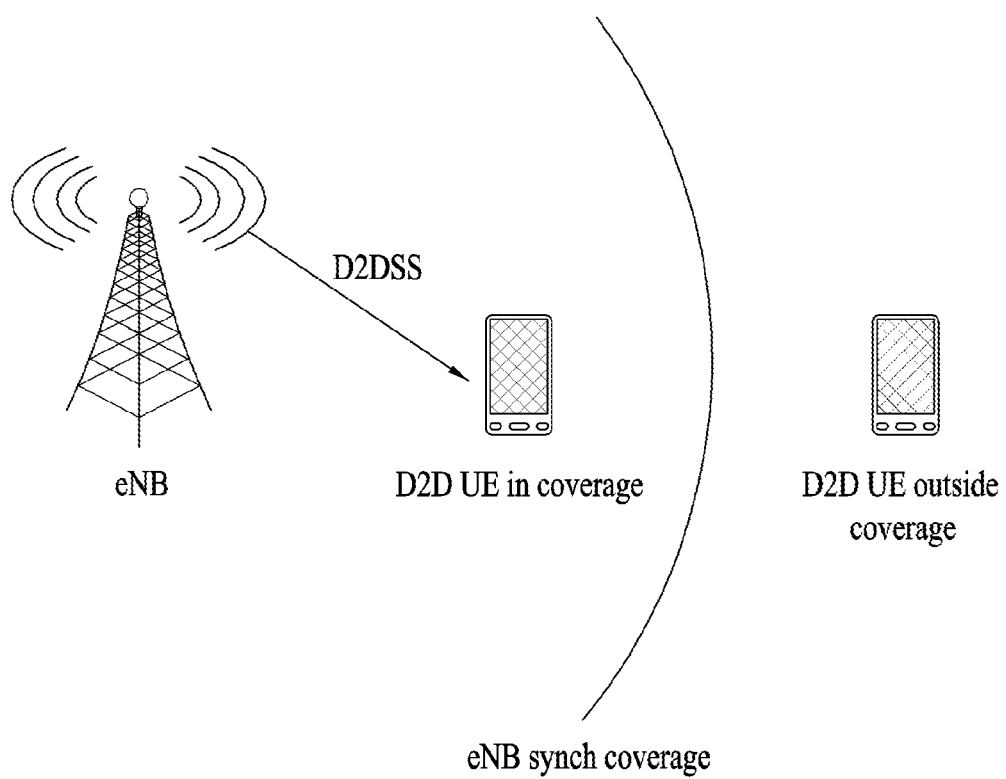
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
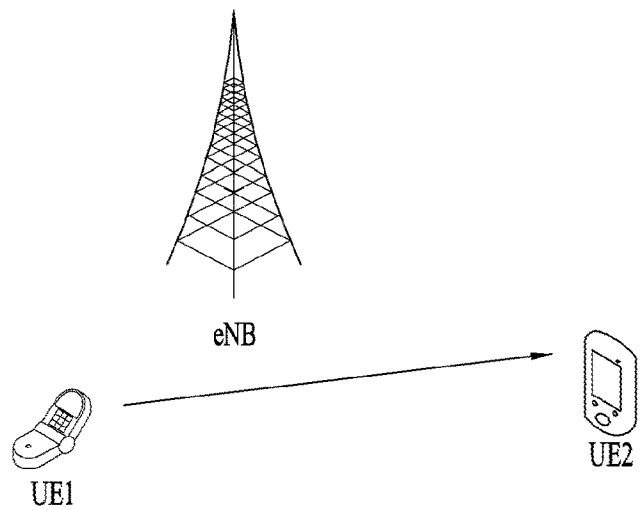
FIG. 8 is a view illustrating an exemplary D2D resource pool for D2D communication.
Figure 8:
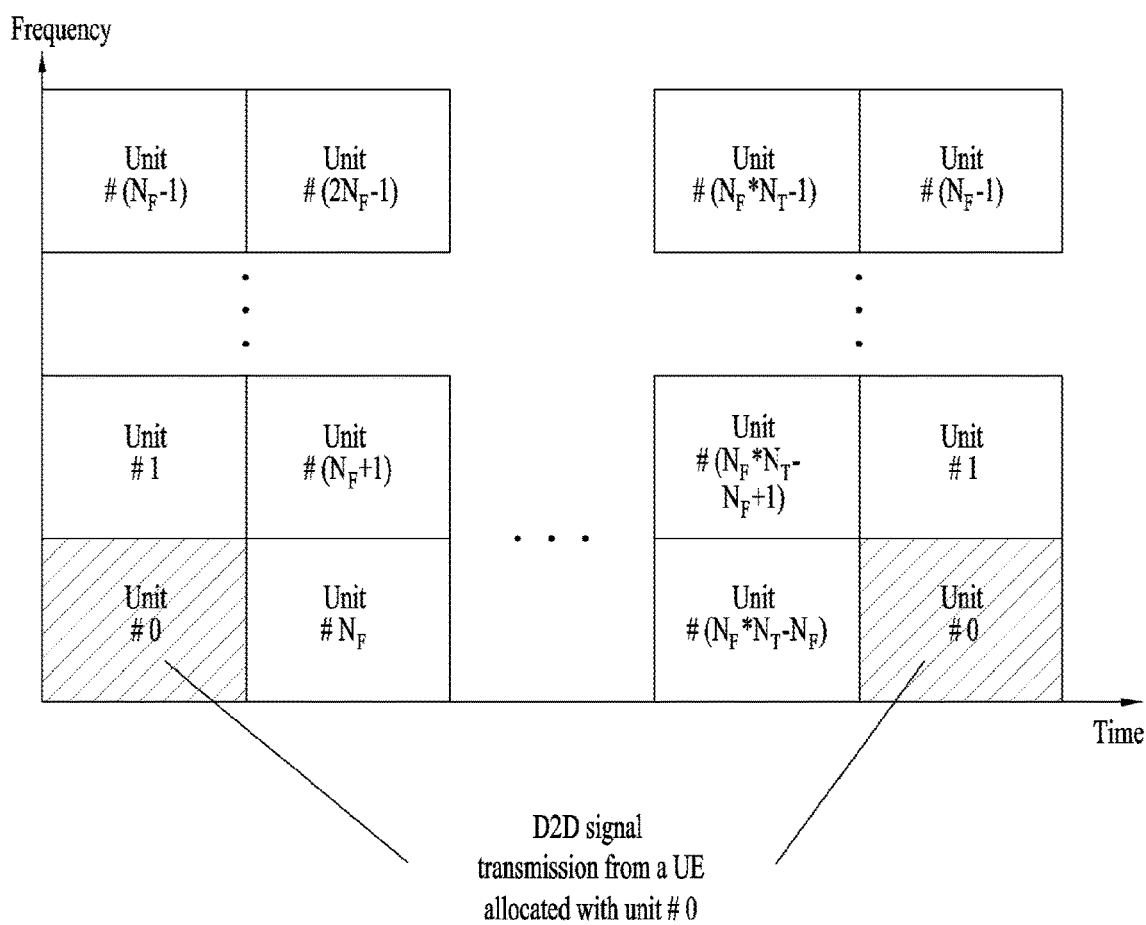

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a Rx UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool.

For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a Tx UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover Tx UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual Tx UE or the individual Tx UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D Tx UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
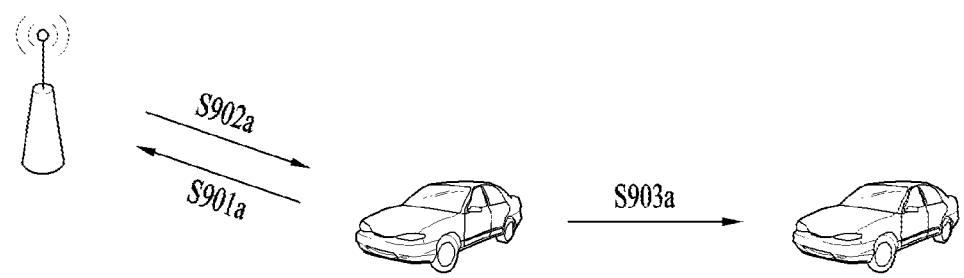
FIG. 9 is a view referred to for describing transmission modes and scheduling schemes for vehicle-to-everything (V2X)
Figure 9:
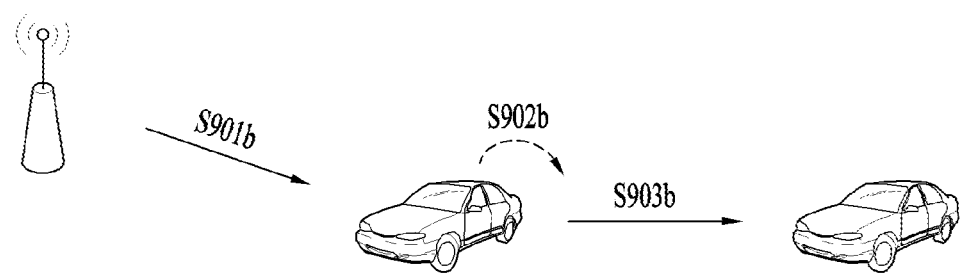
Figure 10:
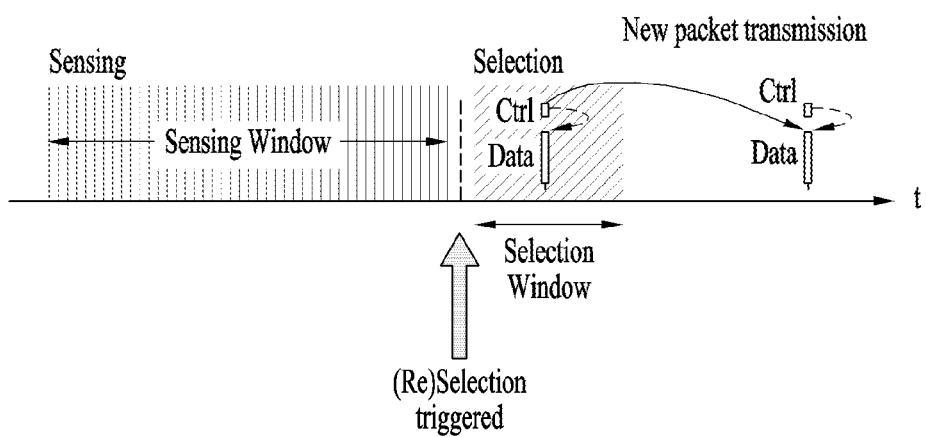
FIG. 10 is a view illustrating a method of selecting resources in V2X.
Figure 11:
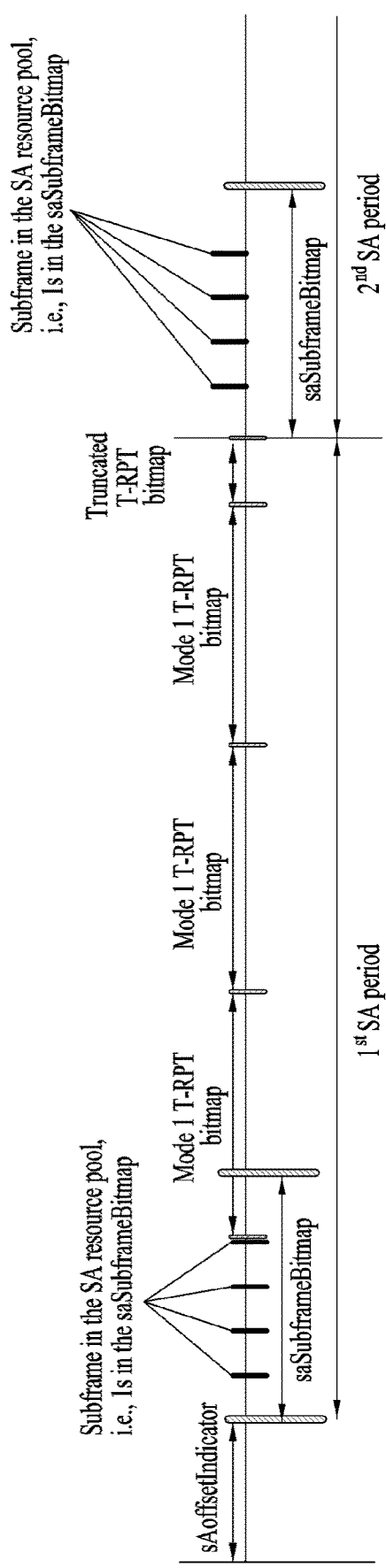
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator, indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A Tx UE performs transmission at T-RPT positions corresponding to 1s in a T-RPT bitmap, and one MAC PDU is transmitted four times.

Figure 12:
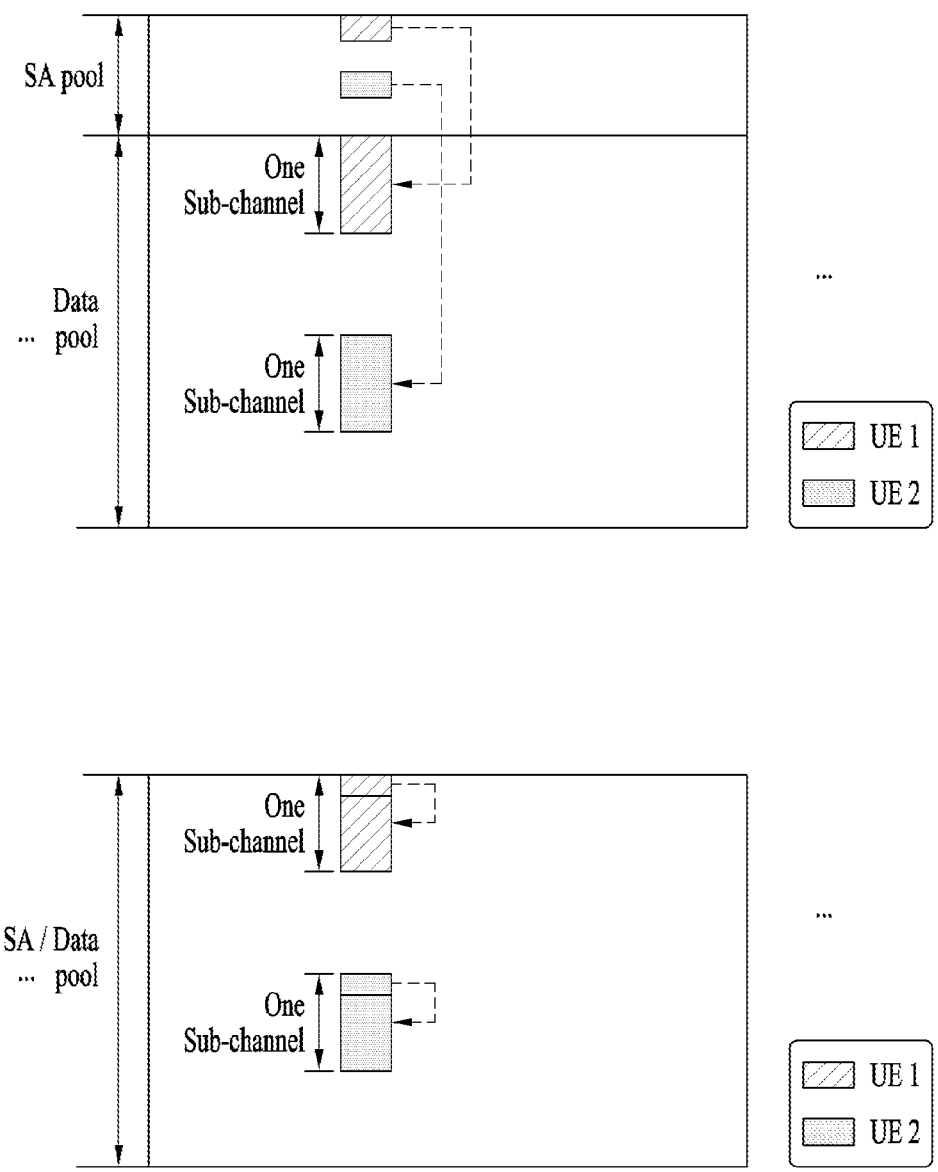
FIG. 12 is a view referred to for describing an SA and data transmission in V2X.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
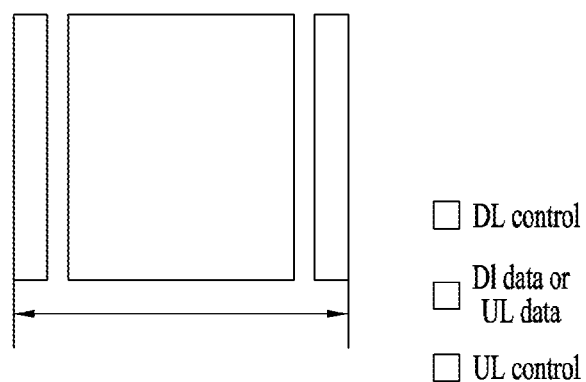
FIGS. 13 and 14 are views illustrating a new radio access technology (new RAT or NR) frame structure.
Figure 14:
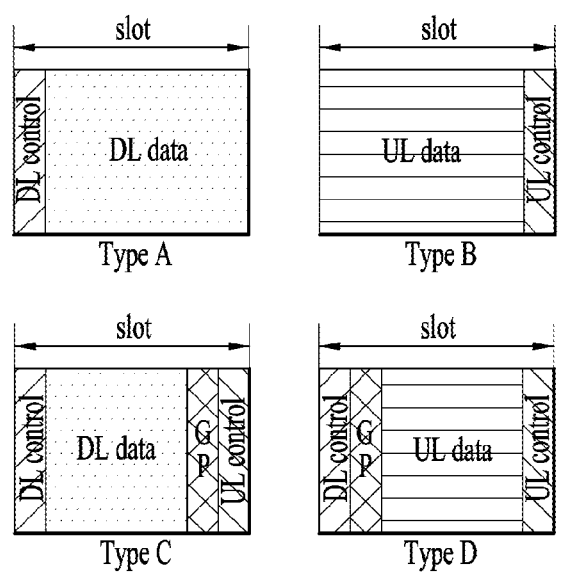

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

NR supports a plurality of numerologies (or subcarrier spacings (SCSs)) to support various 5G services. For example, an SCS of 15 kHz supports services in a wide area in traditional cellular bands, and an SCS of 30 kHz or 60 kHz supports services in a dense-urban area, lower latency, and wider carrier bandwidth. An SCS of 60 kHz or higher supports services in bandwidth greater than 24.25 kHz in order to overcome phase noise.

An NR frequency band defines two types of frequency ranges FR1 and FR2. FR1 may represent a sub-6 GHz range, and FR2 may represent an above-6 GHz range as a millimeter wave (mmWave).

Table 1 below shows definition of the NR frequency band.

TABLE 11

| Frequency Range Designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

Propagation Delay and CP Length

In legacy sidelink transmission, a plurality of UEs has performed an operation of aligning synchronization with a common synchronization reference and transmitting signals together using different frequency resources. Here, a signal used for the synchronization reference may be a sidelink synchronization signal (SLSS) that different UEs transmit on sidelink, a satellite signal such as a global navigation satellite system (GNSS), or a synchronization signal that the eNB transmits.

In the case of ideal sidelink transmission in a wireless communication system, each Tx UE starts to transmit signals, such as data or control information, in alignment with a subframe boundary or a symbol boundary derived by the common synchronization reference. In addition, each Rx UE may configure an Rx window based on the symbol boundary and apply fast Fourier transform (FFT) to a signal received through the Rx window, thereby extracting the data or the control information transmitted through each frequency resource.

However, in actually performed sidelink transmission, propagation delay until signals arrive from Tx UEs to Rx UEs is added to a Tx/Rx process. Therefore, problems arise from the viewpoint of the Rx UEs in that signals are received at timings other than the subframe boundary or symbol boundary derived from the synchronization reference, and signal arrival timings differ according to distances with the Tx UEs. Such an arrival timing error in signal transmission and reception, caused by the propagation delay, may be corrected by successfully decoding individual signals received through FFT or orthogonally separating signals transmitted from different Tx UEs, if the propagation delay value is maintained within a CP from the Rx window configured for the Rx UEs. However, when a CP length is shortened, the propagation delay of signals received by the Rx UEs may not be within the CP length from the Rx window. In this case, the conventional method of configuring the Rx window and performing decoding through FFT, by the Rx UEs, inevitably leads to performance deterioration.

In particular, considering a situation in which a transmission time interval (TTI) is shortened and an SCS is widened in an NR system, sidelink transmission in an mmWave band may be based on resources having a shortened CP length. For example, a legacy LTE system uses a single SCS of 15 kHz to set an OFDM symbol length to 66.67 µs, whereas the NR system uses a wider SCS of 30 kHz, 60 kHz, 120 kHz, or 240 kHz according to a used frequency band to thereby shorten an OFDM symbol length to 33.33 µs, 16.67 µs, 8.33 µs, or 4.17 µs. When the OFDM symbol length is shortened, the CP length configured in a symbol is also shortened, and the case in which arrival timing errors of Rx signals do not fall within the CP length increases.

Figure 15:
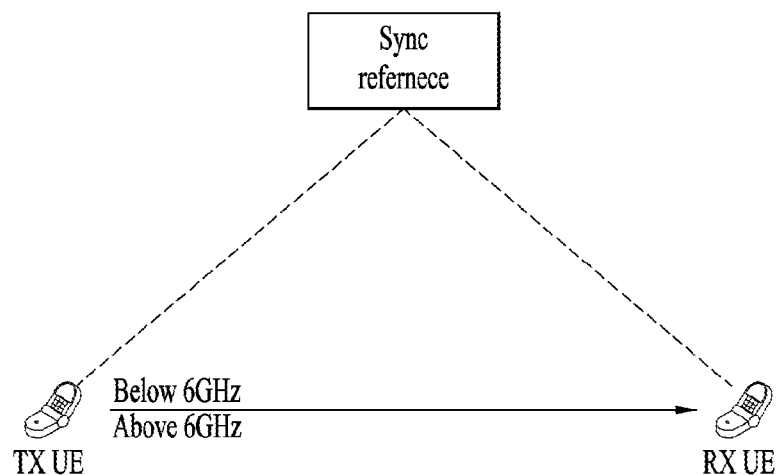
FIG. 15 is a view illustrating an example of communication between UEs operating in alignment with a common synchronization reference.

FIG. 15 illustrates an example of communication between UEs in which a Tx/Rx operation in an above-6 GHz frequency band and a below-6 GHz frequency band is performed in alignment with a common synchronization reference. In FIG. 15, a Tx UE and/or an Rx UE transmit/receive signals by configuring the same subframe boundary or symbol boundary according to the same synchronization reference for the above-6 GHz frequency band and the below-6 GHz frequency band. For example, the Tx UE and/or the Rx UE may perform a Tx/Rx operation by equally applying timing synchronization acquired in the below-6 GHz frequency band even to the above-6 GHz frequency band.

The Tx UE may transmit a signal (or channel) to the Rx UE in the above-6 GHz frequency band or the below-6 GHz frequency band. In this case, the signal may be transmitted based on a different SCS depending on in which frequency band of the above-6 GHz frequency band and the below-6 GHz frequency band the signal is transmitted, and the CP length may vary accordingly. When the Tx UE transmits a signal in the above-6 GHz frequency band, the signal may be transmitted based on a larger SCS, and the CP length may be shortened. In contrast, when the Tx UE transmits a signal in the below-6 GHz frequency band, the signal may be transmitted based on a smaller SCS, and the CP length may be extended. When the CP length is shortened, the aforementioned situation occurs in which the timing error caused by the propagation delay does not fall within the shortened CP length, and this example is illustrated in FIG. 16.

Figure 16:
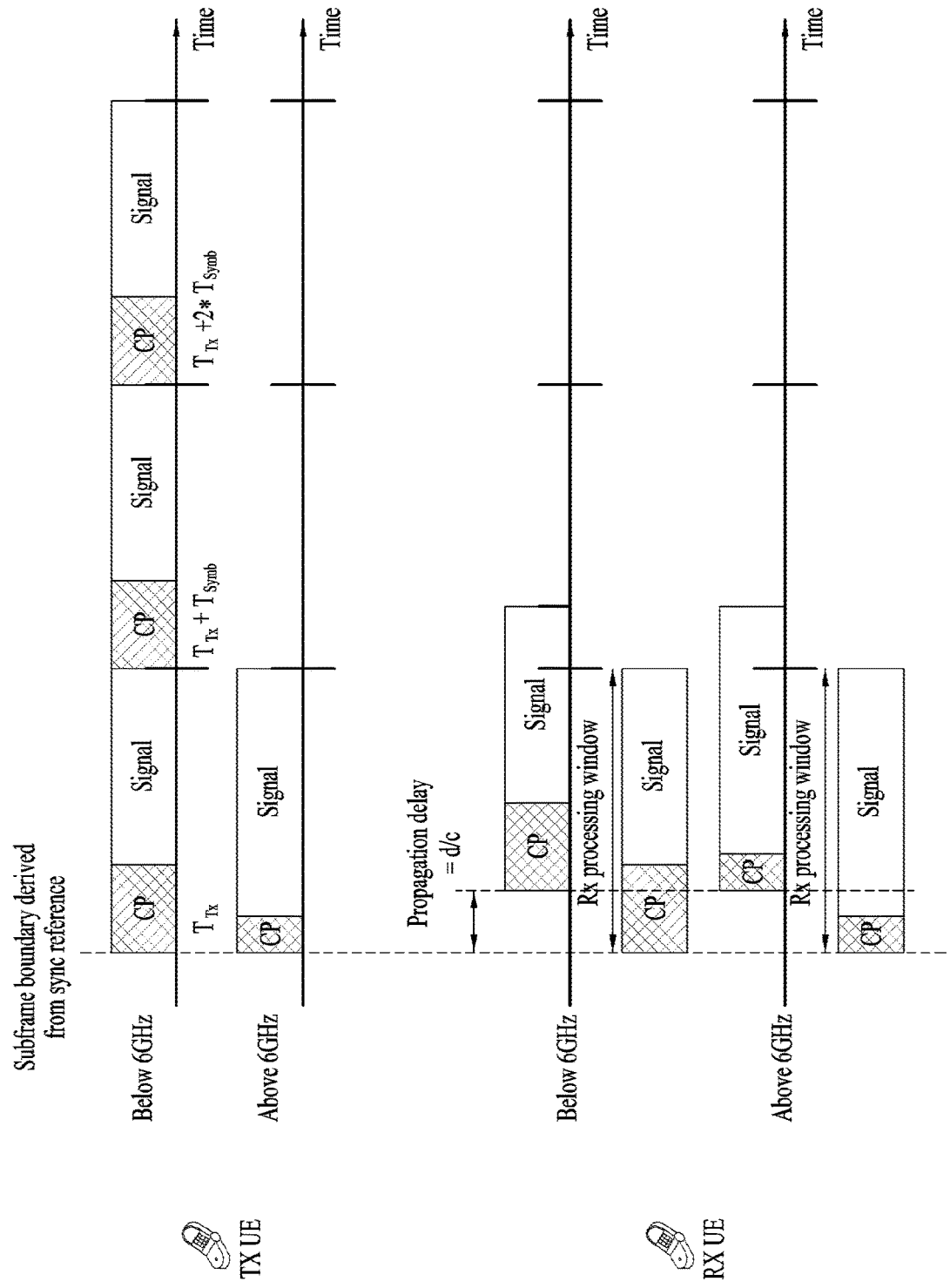
FIG. 16 is a view illustrating propagation delays and cyclic prefix (CP) lengths of signals transmitted and received in an above-6 GHz or below-6 GHz frequency band.

FIG. 16 illustrates a situation in which the Tx UE transmits signals (or channels) in an above-6 GHz frequency band and/or a below-6 GHz frequency band and the Rx UE receives signals (or channels) in the above 6 GHz frequency band and/or the below-6 GHz frequency band in consideration of propagation delay. The Tx UE and the Rx UE configure the same subframe boundary or symbol boundary for the above-6 GHz frequency band and the below-6 GHz frequency band according to a common synchronization reference. When the Tx UE transmits a signal at a certain timing, the Rx UE receives the signal at a timing delayed by a propagation delay. In this case, the propagation delay is a value calculated in consideration of the speed c of light and a distance d between the Tx UE and the Rx UE, corresponding to a value d/c obtained by dividing the distance between the Tx UE and the Rx UE by the speed of light.

In FIG. 16, the Tx UE transmits a signal having a relatively long CP length in the below-6 GHz frequency band and transmits a signal having a relatively short CP length in the above-6 GHz frequency band. In this case, the signal transmitted in the below-6 GHz frequency band and the signal transmitted in the above-6 GHz frequency band experience the same or similar propagation delay and arrive at the Rx UE.

From the viewpoint of the Rx UE receiving the signals on frequency carriers of different transmission bands, since a propagation delay timing error for the signal having the relatively long CP length falls within the CP length, there is no problem with Rx window configuration and decoding. For example, in FIG. 16, it may be appreciated that the propagation delay timing error of the signal transmitted on a frequency carrier of the below-6 GHz frequency band is within the CP length. In contrast, the propagation delay timing error of the signal having a relatively short CP length is not within the CP length and thus a problem may occur with Rx window configuration and decoding. That is, when Rx window configuration and decoding for the above-6 GHz frequency band are performed by aligning the same timing synchronization as synchronization for the below-6 GHz frequency band, Rx performance deteriorates. For example, in FIG. 16, it may be appreciated that the propagation delay timing error of the signal transmitted on a frequency carrier of the above-6 GHz frequency band is equal to or greater than the CP length.

Therefore, for a signal with a relatively short CP length, it is necessary to adjust an error caused by the propagation delay to be within the CP length through a method in which the Tx UE adjusts a Tx timing of a signal or the Rx UE adjusts an FFT window boundary timing.

In FIGS. 15 and 16, for convenience of description, signals (or channels) are distinguished as having different CP lengths depending upon on which transmission carrier of any one of the above-6 GHz frequency band and the below-6 GHz frequency band a corresponding signal (channel) is transmitted in alignment with a common synchronization reference. However, a method of the present disclosure is not limited to a situation in which the CP length varies according to a frequency band and may be applied to any situation in which signals having different CP lengths are transmitted and received in alignment with the same synchronization reference. For example, the reason why the CP lengths of the two Tx carriers are different may be that SCSs of the two Tx carriers are different, or a normal CP is configured for one Tx carrier and an extended CP is configured for the other Tx carrier, or the above two causes function in combination. Here, an operation of transmitting/receiving signals of different CP lengths in alignment with the same synchronization reference may mean an operation of transmitting/receiving signals of different CP lengths in alignment with timing synchronization derived based on the same synchronization source. Alternatively, the operation of transmitting and receiving signals of different CP lengths in alignment with the same synchronization reference may mean an operation of transmitting and receiving signals of different CP lengths in alignment with timing synchronization in which a timing synchronization error is within a predetermined or signaled threshold.

According to an example or implementation of the present disclosure, a Tx/Rx timing may be adjusted by applying a timing advance between sidelink UEs when a problem arises in which a CP length is shortened in vehicle-to-everything (V2X) communication using an mmWave band and thus the CP length does not include all propagation delays.

For convenience of description, it is assumed in the present disclosure that an SLSS transmitted between UEs has a CP length longer than timing errors caused by propagation delays of all UEs within a synchronization cluster to guarantee coverage. That is, a carrier (signal or channel) through which the SLSS is transmitted may be interpreted as a carrier configured to have a relatively longer CP length than other carriers excluding the corresponding carrier. Here, an SCS of the carrier on which the SLSS is transmitted and SCSs of the other carriers may be different or the same. The reason why the CP length of a carrier on which an SLSS is transmitted is long may be that the SCSs are different, or an extended CP is configured for the carrier on which the SLSS is transmitted, or the above two causes function in combination.

In addition, in the present disclosure, UEs configure the same timing synchronization for two or more carriers having different CP lengths to transmit and receive signals. In this case, a carrier referenced to acquire a subframe boundary (or symbol boundary) for timing synchronization is defined as an anchor carrier (anchor channel or anchor signal). That is, a carrier on which the SLSS is transmitted may be interpreted as the anchor carrier. Hereinbelow, for convenience of description, while acquisition and configuration of the timing synchronization will described as being commonly applied to carriers having different CP lengths, including the anchor carrier, the present disclosure is not limited thereto and acquisition and configuration of the timing synchronization may be commonly applied to signals, channels, bandwidth parts (BWPs), or resource pools, which have different CP lengths.

As an example, when sidelink communication between UEs is performed, the SLSS may be transmitted and received on a below-6 GHz frequency band carrier and data may be transmitted and received on an above-6 GHz frequency band carrier. In this case, the below-6 GHz frequency band carrier becomes the anchor carrier, and the above-6 GHz frequency band carrier becomes a carrier that follows or shares timing synchronization derived from the anchor carrier. The carrier that follows or shares timing synchronization derived from the anchor carrier may be (1) a carrier having a shorter CP length than the anchor carrier, (2) a carrier transmitted in a lower frequency band than the anchor carrier, and/or (3) a data transmission channel such as a physical sidelink shared channel (PSSCH) and/or a control information transmission channel such as a physical sidelink control channel (PSCCH).

The anchor carrier on which the SLSS is transmitted is not always limited to being configured for the below-6 GHz frequency band. When the UE transmits the SLSS on the below-6 GHz frequency band carrier, the UE may reduce the effect of a propagation delay on the SLSS by transmitting the SLSS mapped to symbols with a long CP length. In addition, since the above-6 GHz frequency band is a high frequency band having a relatively smaller distance range than the below-6 GHz frequency band, the UE may more easily adjust synchronization by transmitting and receiving the SLSS in the below-6 GHz frequency band which is easy to access due to a large distance range.

Here, if the below-6 GHz frequency band is categorized or subdivided into a plurality of frequency bands, the UE may adjust synchronization by transmitting the SLSS in a specific frequency band such as the lowest frequency band among the categorized or subdivided frequency bands of the below-6 GHz frequency band. In the current NR system, BWPs for a low frequency band are not separately classified. However, if the BWPs for the low frequency band may be classified, the above SLSS transmission method may be applied. In this case, the UE may apply synchronization reference information obtained by transmitting and receiving the SLSS through one BWP such as a BWP of the lowest frequency in the low frequency band to another BWP in the low frequency band or to a high frequency band.

Hereinafter, a method will be described of configuring a subframe boundary for timing synchronization in consideration of a propagation delay and applying a TA, when the UE receives the SLSS on the anchor carrier from another synchronization source UE.

Configuration of Subframe Boundary and Application of TA

In performing unicast-based communication between vehicle UEs, when a second UE becomes a synchronization source UE of a first UE, the first UE may adjust synchronization based on an Rx timing of an SLSS transmitted by the second UE and then adjust a Tx/Rx timing in communicating with the second UE.

The SLSS transmitted by the second UE is transmitted on an anchor carrier, and the first UE derives a certain subframe boundary based on timing synchronization acquired through the anchor carrier on which the SLSS is received. In this case, the first UE commonly configures the derived subframe boundary even with respect to other partial or all carriers having a shorter CP length than a CP of the anchor carrier. In addition, the first UE may obtain a propagation delay value by receiving the SLSS and determine that the obtained propagation delay value is equally applied even to carriers other than the anchor carrier. In this case, the propagation delay value may be a value d/c obtained by dividing the speed c of light by the distance d between the Tx UE and the Rx UE.

When the first UE that has received the SLSS transmits a signal on some or all carriers based on a shorter CP length than a CP of the anchor carrier to the second UE, the first UE may receive the signal by advancing the signal by twice the propagation delay value obtained based on configured subframe boundary timings. That is, the subframe boundary of the first UE is more delayed by the propagation delay than the subframe boundary of the second UE and there is also a propagation delay that occurs when the first UE transmits a signal to the second UE. Considering these situations, the first UE transmits the signal by applying a TA equal to twice the propagation delay. Therefore, even if the signal transmitted by the first UE suffers the propagation delay, the second UE receiving the corresponding signal may receive and decode the signal in alignment with a subframe boundary timing thereof.

In this case, the signal transmitted on the anchor carrier to configure synchronization reference is not limited to the SLSS. For example, the second UE may transmit a tracking reference signal (TRS) for time tracking, rather than SLSS, on the anchor carrier. In this case, the first UE may receive the TRS on the anchor carrier to configure timing synchronization based on an Rx timing of the TRS and to configure a subframe boundary and an Rx window. In the same manner as the above-described method, the first UE that has configured timing synchronization may acquire a propagation delay value and transmit a signal to the second UE by applying a TA equal to twice the propagation delay value, so that the second UE may receive the signal based on the subframe boundary.

Figure 17:
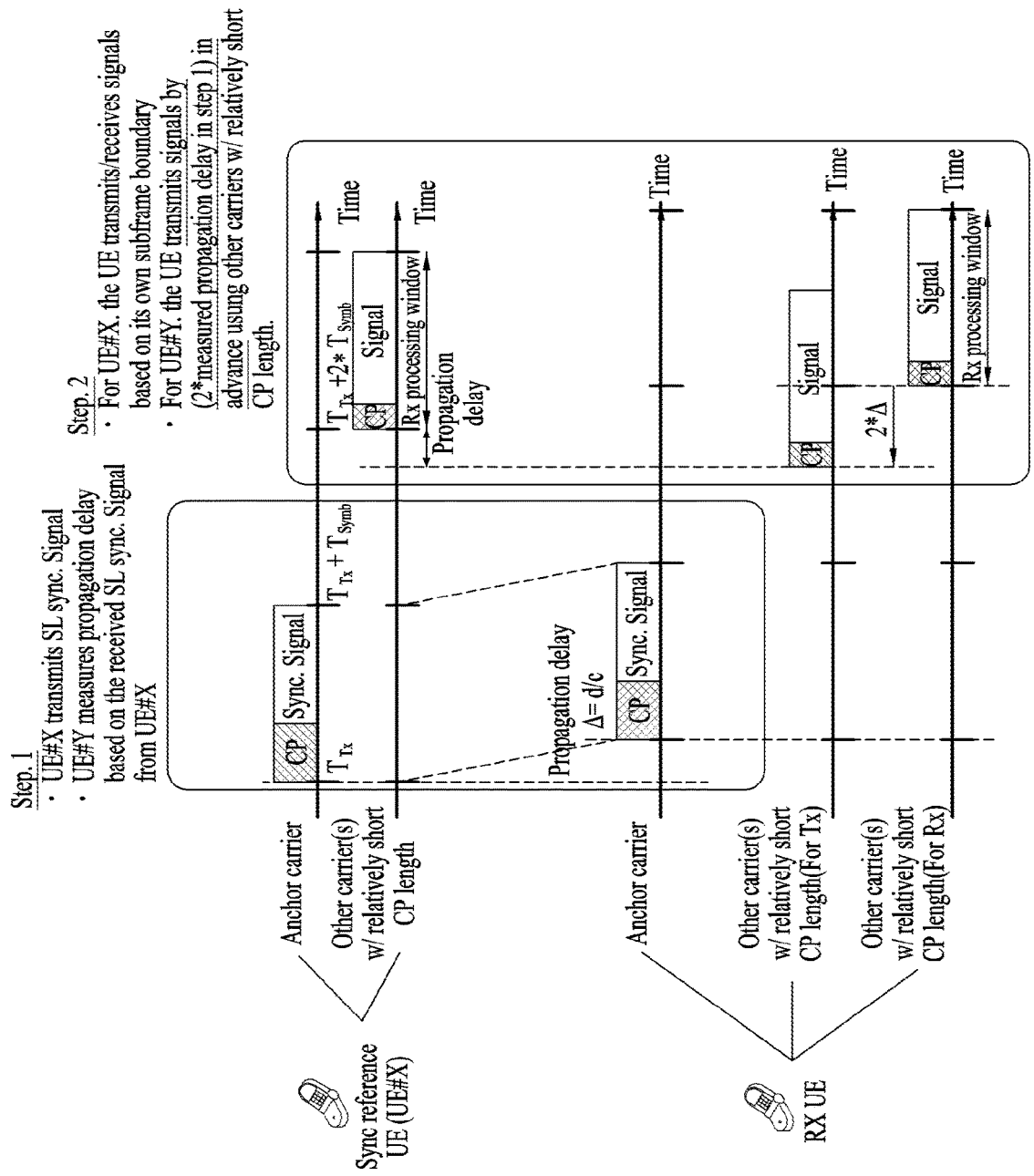
FIG. 17 is a view illustrating an embodiment of the present disclosure in which a transmission UE and a reception UE configure timing synchronization.

FIG. 17 is a diagram illustrating an embodiment related to this method. In FIG. 17, UE #X (second UE) is a synchronization reference UE corresponding to a synchronization source UE of UE #Y (first UE). UE #X transmits an SLSS on an anchor carrier to configure timing synchronization of UE #Y. UE #Y configures timing synchronization based on a timing at which the SLSS is received on the anchor carrier and commonly applies the timing synchronization to carriers other than the anchor carrier. UE #Y may also measure and obtain a propagation delay by receiving the SLSS and determine that the obtained propagation delay is equally applied to carriers other than the anchor carrier. In this case, the propagation delay may be a value d/c obtained by dividing the speed c of light by the distance d between the Tx UE and the Rx UE.

When UE #Y that has configured timing synchronization even for the carriers other than the anchor carrier then transmits a signal on the carriers, UE #Y transmits a signal by advancing the signal by twice the propagation delay value so that UE #X may receive the signal in alignment with a subframe boundary. This considers the situation in which the subframe boundary of UE #Y is further behind than the subframe boundary of UE #X by the propagation delay and the situation in which the propagation delay occurs again when UE #Y transmits the signal to UE #X. UE #X that has received a signal in alignment with the subframe boundary thereof may then accurately process the signal through decoding configuration matching the subframe boundary thereof.

While, in FIG. 17, UE #Y adjusts a Tx/Rx timing in an (N+2)-th unit TTI based on the SLSS received in an N-th unit TTI on an anchor carrier thereof, this is purely one embodiment and does not limit a Tx/Rx timing adjustment interval. For example, UE #Y that has received the SLSS at the N-th unit TTI may adjust a Tx/Rx timing so as to transmit the signal at a desired timing such as an (N+3)-th or (N+4)-th unit TTI, or thereafter. In this case, no matter in which TTI the signal is transmitted, UE #Y transmits the signal by applying a TA equal to twice the propagation delay.

Configuration of Subframe Boundary from GNSS and Application of TA

The above method has been applied based on the case in which the first UE configures the subframe boundary thereof based on the Rx timing of the SLSS received from the second UE. However, a similar timing adjustment method may be applied not only to this case but also to the case in which subframe boundaries of the first UE and the second UE are configured based on timing synchronization aligned through the GNSS. In this case, the first UE and the second UE configure the same timing synchronization from the GNSS, unlike the previous method in which subframe boundaries configured through the SLSS have a difference by the propagation delay.

In this case, the first UE performs the following operation for timing adjustment in signal transmission and reception to and from the second UE. When the first UE transmits a signal to the second UE on some or all carriers having a shorter CP than a CP of an anchor carrier, the first UE may transmit the signal by advancing the signal by a propagation delay based on timing synchronization and a subframe boundary configured based on the GNSS. Conversely, when the first UE receives a signal from the second UE on some or all carriers having a shorter CP than a CP of the anchor carrier, the first UE may configure an Rx window and receive the signal by delaying a Tx timing by the propagation delay based on the timing synchronization and the subframe boundary configured based on the GNSS. In this case, the second UE, which is a counterpart UE of unicast communication of the first UE, may perform a Tx/Rx operation in alignment with the timing synchronization and subframe boundary configured based on the GNSS without additional Tx/Rx timing adjustment. The propagation delay may be a value d/c obtained by dividing the speed c of light by the distance d between the Tx UE and the Rx UE.

Even when a signal is transmitted by configuring the timing synchronization based on the GNSS, there is no restriction on a TTI between an Rx timing of a synchronization signal and a Tx timing of a signal to be transmitted. For example, the first UE that has received a synchronization signal at an N-th unit TTI based on the GNSS may adjust a Tx/Rx timing so as to transmit a signal at a desired timing thereafter. In this case, no matter in which TTI the signal is transmitted, the first UE transmits the signal by advancing the signal by the propagation delay.

Transmission and Reception of TA Information

The first UE that receives a synchronization signal to adjust a synchronization reference and transmits a signal such as data or control information according to the synchronization signal is not limited by a TTI between the received synchronization signal and the transmitted signal as described above. However, in order for the first UE performing signal transmission to transmit a signal to which a TA is applied in a K-th unit TTI, the first UE may need to empty some symbols at the rear part of a (K−1)-th unit TTI without using the symbols for transmission and reception of other signals. In this case, the first UE may directly calculate the number of symbols that should be secured to be emptied without being used thereby in order to apply the TA based on a synchronization signal received on an anchor carrier thereof. Therefore, upon transmitting a signal of a relatively short CP length on a carrier other than the anchor carrier by applying TA in the K-th unit TTI, the first UE may use symbols except for symbols calculated for the (K−1)-th unit TTI, for signal transmission and reception to and from the second UE or other UEs.

In this case, information about whether or not TA is applied in the K-th unit TTI and/or information about the number of symbols that should be secured to be emptied without being used in the (K−1)-th unit TTI may be provided to the second UE or other UEs performing transmission and reception with the first UE. As an example, the first UE that has calculated the number n of symbols to be emptied in the (K−1)-th unit TTI may transmit information indicating that TA will be applied in the K-th unit TTI and information about the number n of symbols to be emptied to the second UE or other UEs prior to signal transmission/reception to/from the second UE or other UEs.

Figure 18:
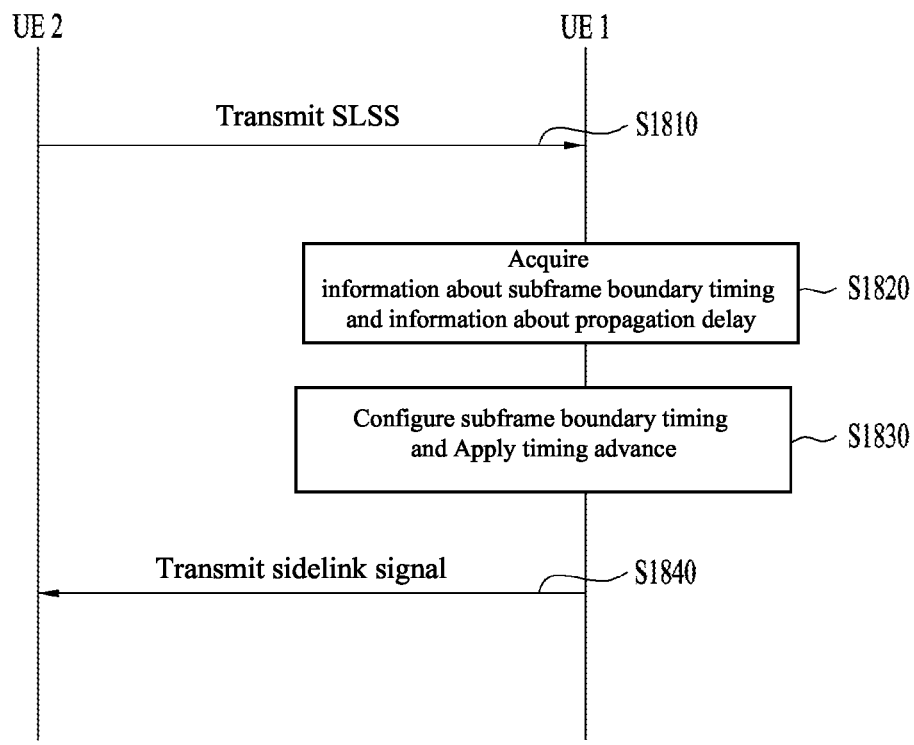
FIG. 18 is a flowchart illustrating a sidelink signal transmission operation of UEs according to an example or implementation of the present disclosure.

FIG. 18 is a flowchart illustrating a signal Tx/Rx operation of a UE according to an example or implementation of the present disclosure. In FIG. 18, a first UE receives an SLSS from a second UE (S1810). The received SLSS may be a synchronization signal transmitted on a carrier of a frequency band based on a relatively long CP length. The first UE may compare a timing at which the SLSS is received with a timing at which the second UE transmits the SLSS to obtain information about a subframe boundary timing and information about a propagation delay, for timing synchronization (S1820). The first UE may configure the subframe boundary timing by performing timing synchronization based on the acquired information and apply a TA to the configured subframe boundary timing (S1830). In this case, the subframe boundary timing configured for the first UE is a timing delayed by the propagation delay as compared with a subframe boundary time configured for the second UE. In addition, the length of the applied TA corresponds to twice the propagation delay. Thereafter, the first UE transmits a sidelink signal to the second UE based on a timing to which the TA is applied (S1840). Here, the transmitted sidelink signal may be a signal transmitted in a frequency band based on a relatively shorter CP length than a CP length for the previously received SLSS. In addition, the sidelink signal may be a signal including data or control information. The transmitted sidelink signal may be reached in alignment with the subframe boundary timing configured for the second UE.

While the proposed methods have been described based on a unicast scenario assumed for convenience, the methods proposed in the present disclosure may be similarly applied even to a multicast/groupcast/broadcast scenario. In addition, the proposed methods that have described based on a V2V scenario are not limited only to direct communication between UEs and may be similarly applied even to network-to-UE communication. Although the proposed methods may be independently implemented, the proposed methods may be implemented in a combined (added) form of parts of the proposed methods. As an example, the proposed methods may also be used for UL or DL communication. In this case, an eNB or a relay node may use the proposed methods.

Related rules may be configured such that information about whether to apply the proposed methods or information related to rules of the proposed methods may be indicated by an eNB to a UE or by a Tx UE to an Rx UE through a predefined higher layer signal or physical layer signal.

Examples of Communication System to which Present Disclosure is Applied

The description, functions, procedures, proposals, methods, and/or operational flowcharts disclosed in the present disclosure may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
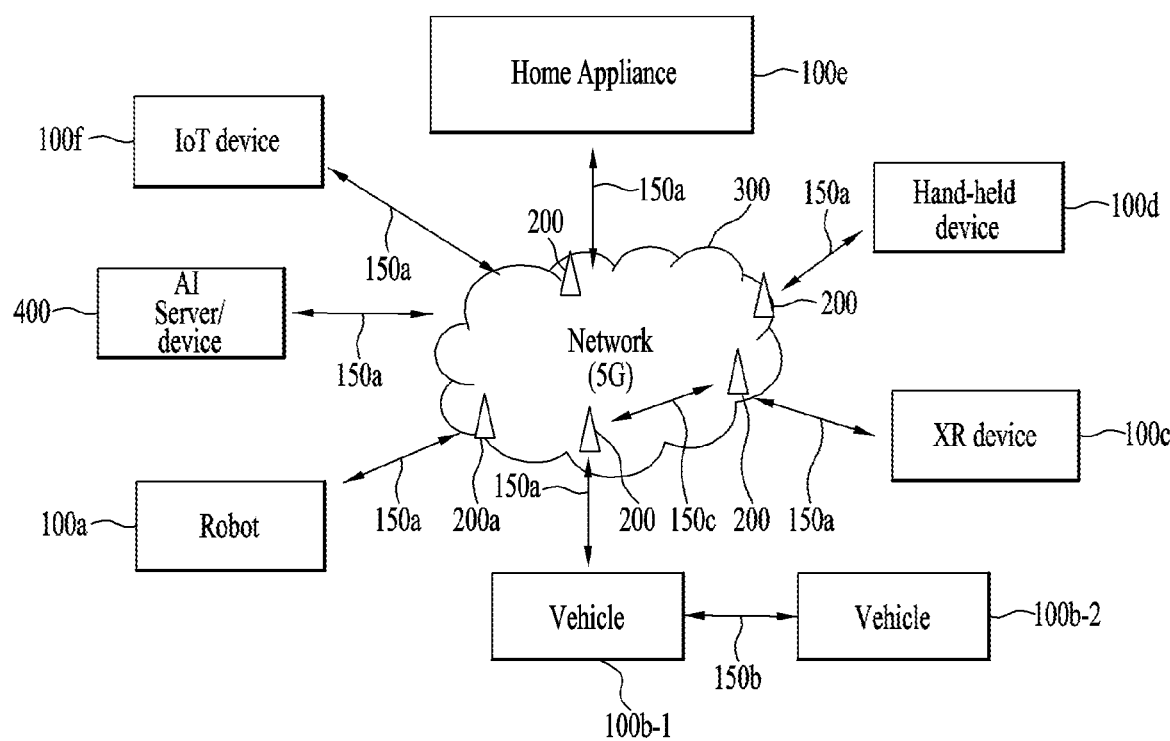
FIGS. 19 to 24 illustrate systems and communication devices to which methods proposed in the present disclosure are applicable.

FIG. 19 illustrates a communication system 1 applied to the present disclosure.

Referring to FIG. 19, the communication system 1 applied to the present disclosure includes wireless devices, BSs, and a network. Here, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a handheld device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. The vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). In addition, the IoT device 100f (e.g., a sensor) may perform direct communication with other IoT devices (e.g., sensors) or other wireless devices 100a to 100f.

Wireless communication/connections 150a, 150b, and 150c may be established between the wireless devices 100a to 100f and the BSs 200, between wireless devices 100a to 100f, and between the BSs 200, respectively. Here, the wireless communication/connections may be established using various RATs (e.g., 5G NR) such as UL/DL communication 150a, sidelink communication 150b (or D2D communication), and communication 150c between the BSs (e.g., a relay or integrated access backhaul (IAB)). The wireless devices and the BSs, the wireless device and the wireless device, and the BS and the BS may transmit/receive radio signals to/from each other through the wireless communication/connections 150a, 150b, and 150c. For example, the wireless communication/connections 150a, 150b, and 150c may transmit/receive signals through various physical channels. To this end, at least a part of various configuration information configuring processes, various signal processing processes (e.g., channel encoding/decoding, modulation/demodulation, and resource mapping/demapping), and various resource allocation processes, for transmitting/receiving radio signals, may be performed based on the various proposals of the present disclosure.

Figure 20:
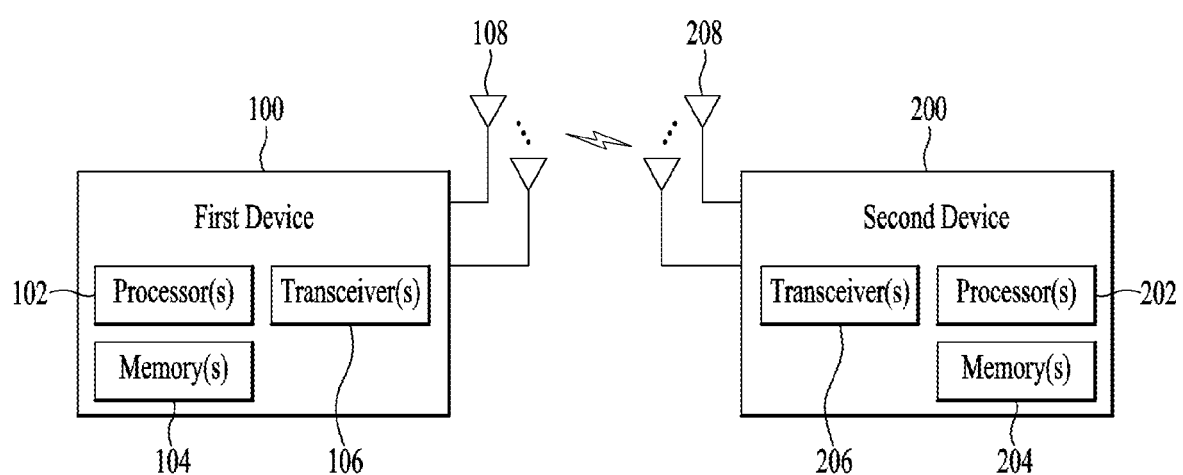

FIG. 20 illustrates examples of wireless devices applicable to the present disclosure.

Referring to 20, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in the present disclosure. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the description, functions, procedures, proposals, methods, and/or operational flowcharts disclosed in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or the entirety of processes controlled by the processor(s) 202 or store software code including instructions for performing the description, functions, procedures, proposals, methods, and/or operation flowcharts disclosed in the present disclosure. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in the present disclosure. The one or more processors 102 and 202 may generate messages, control information, data, or information according to the description, functions, procedures, proposals, methods, and/or operational flowcharts disclosed in the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the present disclosure may be implemented using firmware or software, and the firmware or software may be configured to include the modules, procedures, or functions. Firmware or software configured to perform the description, functions, procedures, proposals, methods, and/or operational flowcharts disclosed in the present disclosure may be included in the one or more processors 102 and 202 or stored in the one or more memories 104 and 204 so as to be driven by the one or more processors 102 and 202. The description, functions, procedures, proposals, and/or methods disclosed in the present disclosure may be implemented using firmware or software in the form of code, commands, and/or a set of commands.

Specifically, one or more processors 102 and 202 of a first UE supporting sidelink in a wireless communication system may control the transceivers 106 and 206 to receive an SLSS in a frequency band including a symbol of a relatively long CP length.

Upon receiving the SLSS, the one or more processors 102 and 202 may perform timing synchronization based on the SLSS. In this case, the one or more processors 102 and 202 may acquire information about a subframe boundary timing and information about a propagation delay.

The one or more processors 102 and 202 that have performed timing synchronization may transmit a sidelink signal in a frequency band including a symbol of a relatively short CP length by applying a TA to the subframe boundary timing.

The one or more processors 102 and 202 may calculate the number of symbols corresponding to the TA and transmit information about the calculated number of symbols to another UE.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the description, functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
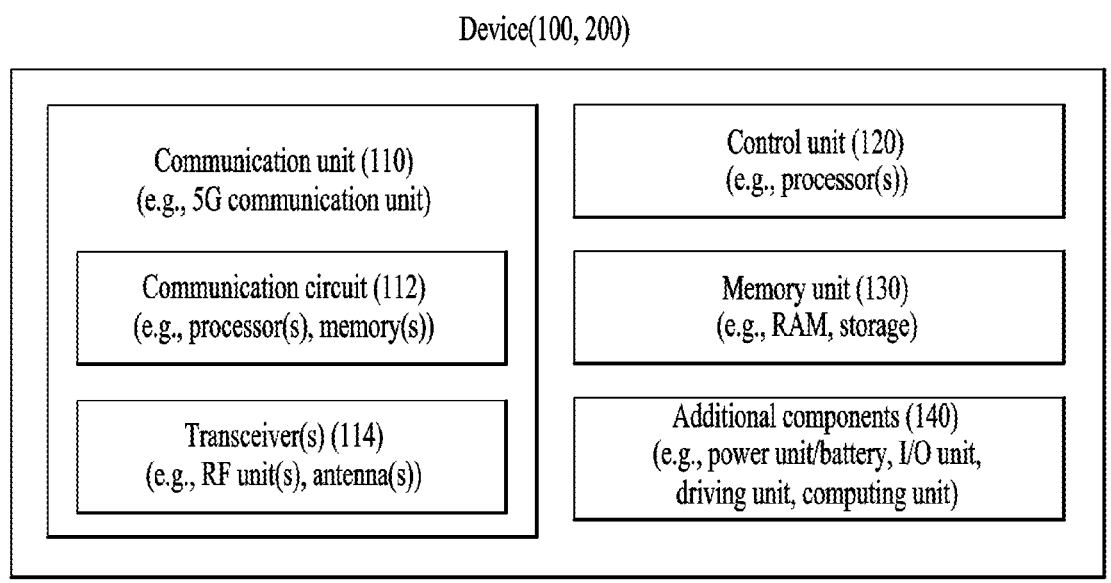

FIG. 21 illustrates another example of a wireless device applied to the present disclosure. The wireless device may be implemented in various forms according to use cases/services (see FIG. 19).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, an input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the handheld device (100d of FIG. 21), the home appliance (100e of FIG. 21), the IoT device (100f of FIG. 21), a digital broadcast terminal, a holographic device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use case/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 22:
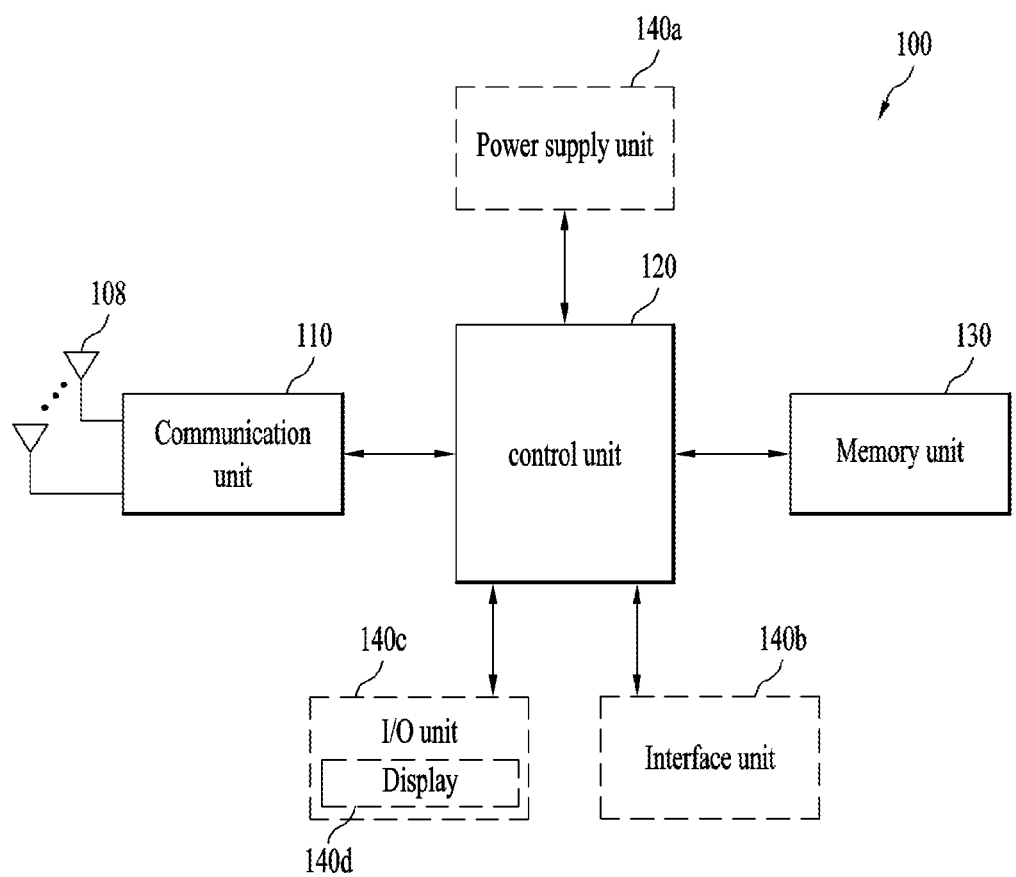

FIG. 22 illustrates a handheld device applied to the present disclosure. The handheld device may include a smartphone, a smartpad, a wearable device (e.g., a smartwatch or smartglasses), or a portable computer (e.g., a notebook). The handheld device may be referred to as an MS, a UT, an MSS, an SS, an AMS, or a WT.

Referring to FIG. 22, a handheld device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the handheld device 100. The control unit 120 may include an application processor (AP). The memory unit 130 may store data/parameters/programs/code/commands needed to drive the handheld device 100. The memory unit 130 may store input/output data/information. The power supply unit 140a may supply power to the handheld device 100 and include a wired/wireless charging circuit, a battery, etc. The interface unit 140b may support connection of the handheld device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
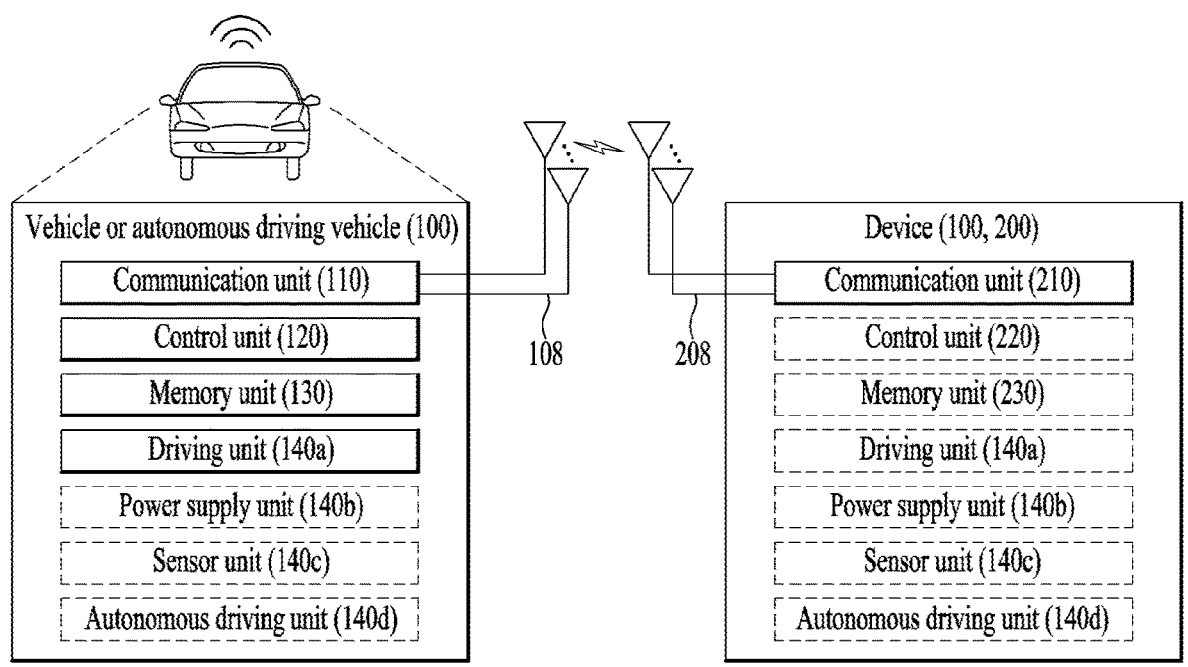

FIG. 23 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110, 130, and 140a to 140d correspond to the blocks 110, 130, and 140 of FIG. 23, respectively.

The communication unit 110 may transmit and receive signals (e.g., data and control signals) to and from external devices such as other vehicles, BSs (e.g., RSUs), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane in which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 24:
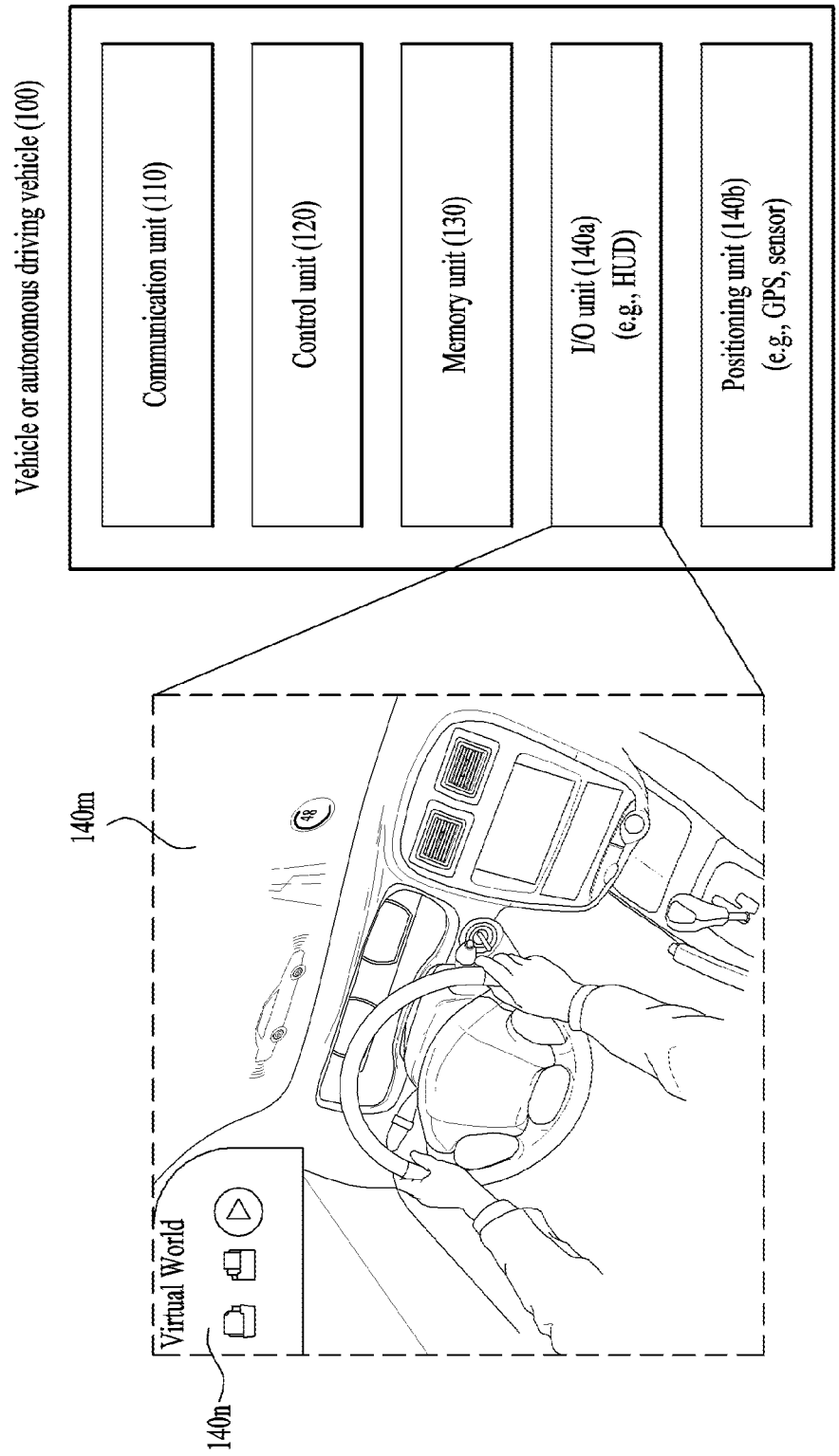

FIG. 24 illustrates a vehicle applied to the present disclosure. The vehicle may be implemented as a transport means, an AV, a ship, etc.

Referring to FIG. 24, a vehicle 100 may include a communication unit 110, a control unit 120, a memory unit 130, an I/O unit 140a, and a positioning unit 140b. Here, the blocks 110 to 130/140a and 140b correspond to blocks 110 to 130/140 of FIG. 23.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object on a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

INDUSTRIAL APPLICABILITY

While the above-described method of transmitting a signal by the UE supporting sidelink in the wireless communication system and the UE therefor have been described focusing on an example applied to the 3GPP LTE/LTE-A and NR systems, the method and the UE are applicable to various wireless communication systems in addition to the 3GPP LTE/LTE-A and NR systems.

The invention claimed is:

1. A method of transmitting a sidelink signal by a first user equipment (UE) supporting sidelink to a second UE in a wireless communication system, the method comprising:
   receiving a sidelink synchronization signal (SLSS) from the second UE;
   acquiring information about a subframe boundary timing for timing synchronization and information about a propagation delay, based on a reception timing of the SLSS; and
   transmitting the sidelink signal to the second UE, based on a timing advance (TA) having a length twice the propagation delay and on the subframe boundary timing.

2. The method of claim 1, wherein the sidelink signal and the SLSS are transmitted on different frequency carriers.

3. The method of claim 1, wherein a cyclic prefix (CP) length for the sidelink signal is shorter than a CP length for the SLSS.

4. The method of claim 2, wherein the sidelink signal is transmitted in an above-6 GHz frequency band and the SLSS is received in a below-6 GHz frequency band.

5. The method of claim 1, wherein the subframe boundary timing is commonly applied to frequency carriers configured for the first UE.

6. The method of claim 1, further comprising calculating the number of symbols related to a length of the TA.

7. The method of claim 6, wherein information about whether the TA is applied to the subframe boundary timing and information about the number of symbols related to the length of the RA are transmitted to the second UE.

8. The method of claim 1, wherein the second UE is a synchronization source UE of the first UE.

9. The method of claim 1, wherein the first UE is communicable with at least one of a UE other than the first UE, a network, a base station, or an autonomous driving vehicle.

10. A first user equipment (UE) supporting sidelink and transmitting a sidelink signal to a second UE in a wireless communication system, the first UE comprising:
    a transceiver configured to transmit a signal; and
    at least one processor configured to control the transceiver,
    wherein the at least one processor
    controls the transceiver to receive a sidelink synchronization signal (SLSS) from the second UE,
    acquires information about a subframe boundary timing for timing synchronization and information about a propagation delay, based on a reception timing of the SLSS, and
    controls the transceiver to transmit the sidelink signal to the second UE, based on a timing advance (TA) having a length twice the propagation delay and on the subframe boundary timing.

11. A first device supporting sidelink and transmitting a sidelink signal to a second device in a wireless communication system, the first device comprising:
    a memory; and
    at least one processor coupled to the memory,
    wherein the at least one processor
    receives a sidelink synchronization signal (SLSS) from the second device,
    acquires information about a subframe boundary timing for timing synchronization and information about a propagation delay, based on a reception timing of the SLSS, and
    transmits the sidelink signal to the second device, based on a timing advance (TA) having a length twice the propagation delay and on the subframe boundary timing.

* * * * *